March 27, 1962 G. G. ATKINSON ET AL 3,027,544
RAILWAY SIGNALLING SYSTEMS
Filed Jan. 31, 1958 10 Sheets-Sheet 1
Fig.1
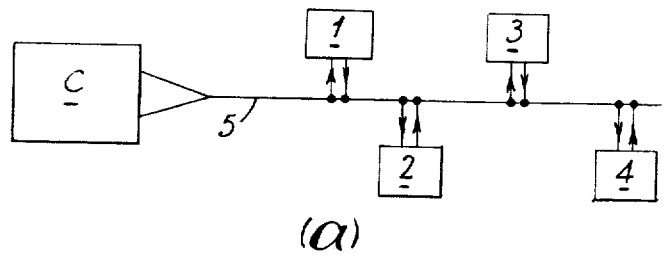
(a)
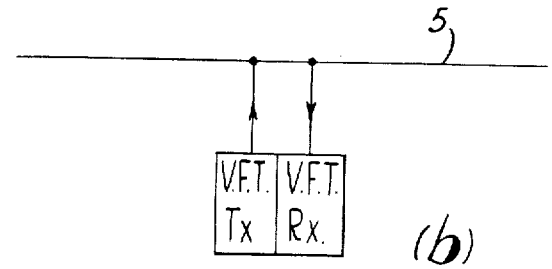
(b)
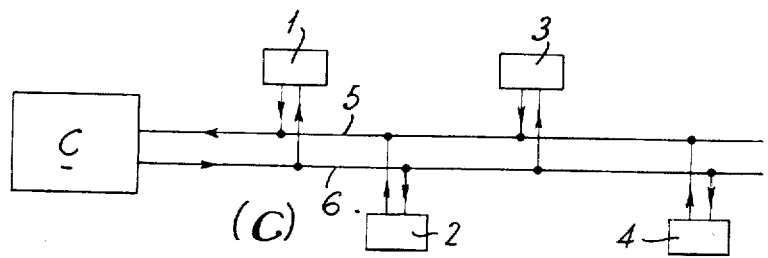
(c)
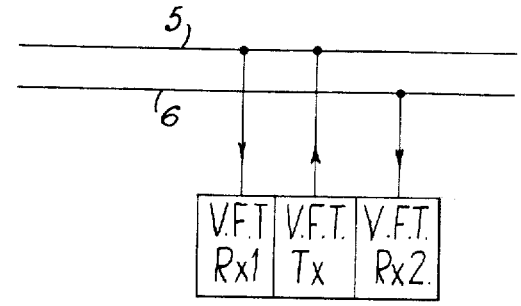
(d)
INVENTOR
GEORGE GEOFFREY ATKINSON
BY
ATTORNEYS March 27, 1962  G. G. ATKINSON ET AL  3,027,544
RAILWAY SIGNALLING SYSTEMS
Filed Jan. 31, 1958
10 Sheets-Sheet 6
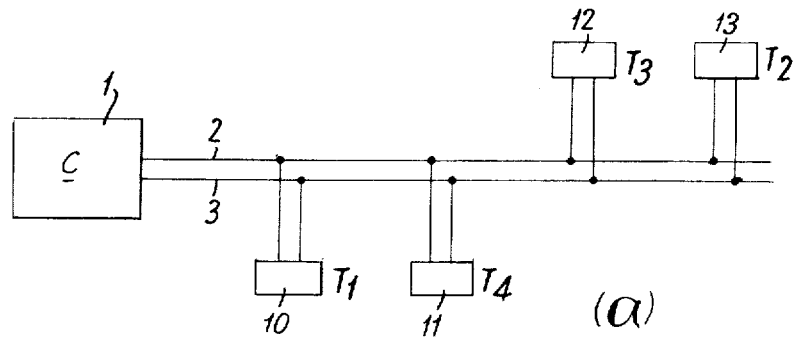
(a)
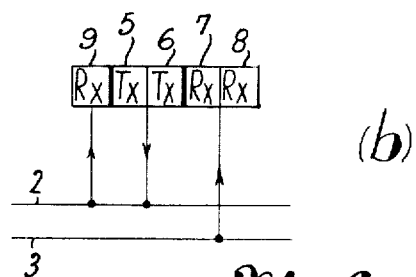
(b)
Fig.6
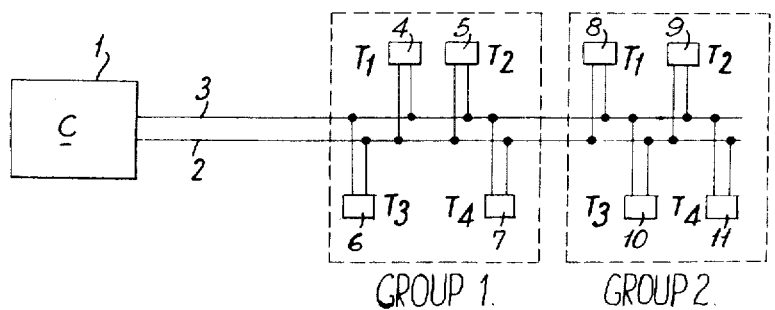
Fig.7
INVENTOR
GEORGE GEOFFREY ATKINSON
BY *Larson and Taylor*
ATTORNEYS

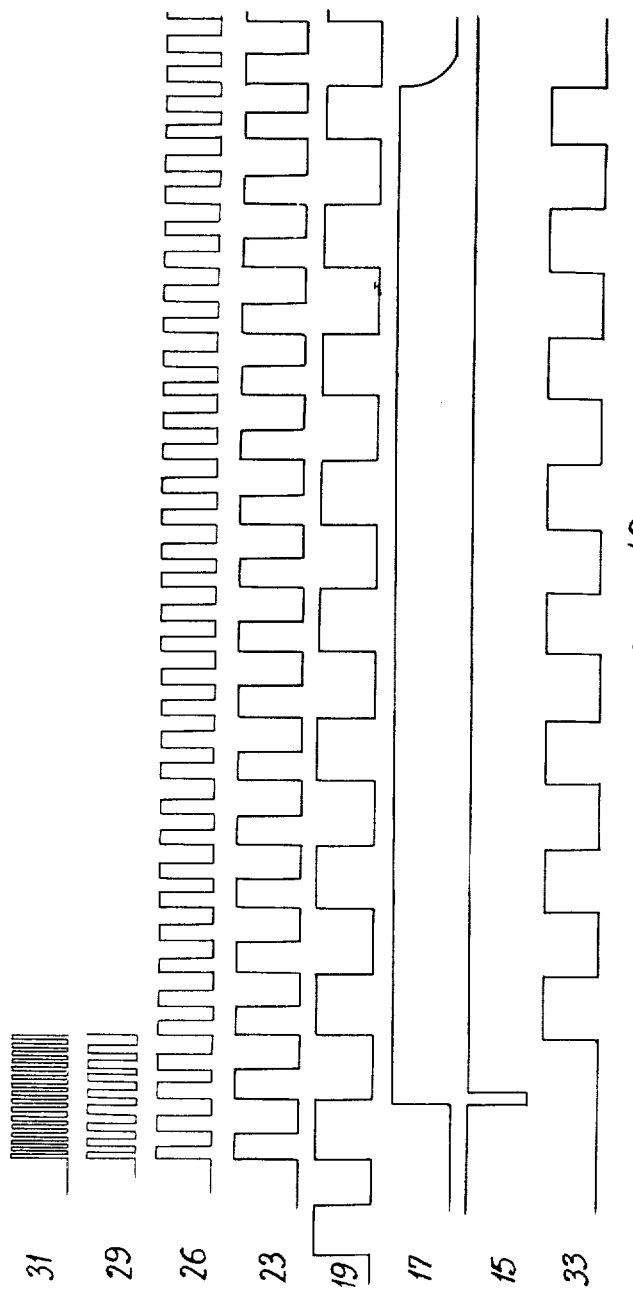

United States Patent Office 3,027,544
Patented Mar. 27, 1962

3,027,544
RAILWAY SIGNALLING SYSTEMS
George Geoffrey Atkinson, Stretford, and George Shand, Sale, England, assignors to Metropolitan-Vickers Electrical Company Limited, London, England, a British company
Filed Jan. 31, 1958, Ser. No. 712,507
Claims priority, application Great Britain Feb. 4, 1957
13 Claims. (Cl. 340—172.5)

As is well known, centralised control systems, as employed for instance for railway traffic control, permit operation of remote equipment such as signals, point machines and so on, and may also permit indication to the control point of the existing state of the controlled equipment and of track occupancy conditions. Such control systems commonly employ digital techniques and work on a time division multiplex basis; for instance one particular version for railways, the so-called "Syncrostep" system, uses a mechanical oscillator as the basic waveform generator and relays as the active elements, transmission being by a pair of interconnecting wires using direct current signals. However the use of relays and other mechanical elements imposes severe limitations on the speed of response of such systems, with consequent limitations on the amount of information which can be transmitted in a given time and hence the volume of traffic which can be controlled.

It is an object of the invention to provide a system, non-exclusively applicable to railways, which is all electronic, except possibly for the final or initial registration of controls or indications, and which can therefore operate at much higher speeds than those in which relays are used as the active elements, the system being such that the limitation on speed may be set only by the transmission medium.

Broadly speaking, the invention provides an electronic system for the transmission of control and/or indication data in digital form between a control station and at least one remote (field) station over line wires or some other form of communication channel. For the purposes of the present disclosure, controlled field station equipment will be considered as being divided into a number of what will be called addresses, while the controlling equipment at the control station is correspondingly divided into address groups. Likewise indicating equipment at the control station will be considered as being divided into addresses corresponding to respective field station address groups from which indications may be received. One or more control addresses and one or more indication address groups may be included in a field station, or a control address or indication address group may possibly include equipment of more than one field station. In respect of controls, the control station is the transmitting station and a remote field station the receiving station: in respect of indications, these roles are reversed. Usually each station would be provided with both a transmitter and a receiver to permit the overall system to be used both for controls and for indications.

Thus according to the invention, there is provided an electronic system for the transmission of digital control and/or indication data between transmitter station address groups and receiver station addresses, in which system the transmitter station comprises means for generating and transmitting a signal by which the action of the receiver station can be synchronised to that of the transmitter station, means for detecting a change in said data, means for generating at least one serial train of signals in response to the aforesaid detected change in the data, a portion of such train consisting of signals which represent data from a particular transmitter station address group including the changed data, and another portion of the train consisting of signals identifying a corresponding receiver station address to which the data so represented is to be transmitted, and means for transmitting such train of signals, with or without subsidiary means for providing parity signals in the serial train, means for detecting that a receiver station has received the transmitted data correctly, and means for causing the signals to be re-transmitted should the receiver station reject the received signals as incompatible. On the other hand the receiver station comprises means for receiving a transmitted serial train of signals, means synchronising the action of the receiver station to that of the transmitter station in response to the transmitted signal which enables this to be done, means for sorting the respective components of the serial train of signals, and means for storing the sorted components from the data portion of the train in a series of discrete storage locations at an address in the receiver station if that address is the one identified by the address portion of the received train, with or without subsidiary means for detecting incompatibilities in the received signals, means for rejecting incompatible signal trains, and means effective when the receiver station has accepted the received signals to send back to the transmitter station a signal indicative of the fact.

If the system includes two or more transmitter stations which may attempt to transmit simultaneously over a common communication channel without discrimination, as regards frequency or otherwise, between their respective transmissions, each such transmitter station may also be provided with means for detecting the presence of a transmitted signal from another such station and for preventing its own transmitter station from starting to send until the detected signal has ceased, together with means for allocating different priorities to these transmitter stations.

In order that the nature of the invention shall be more clearly understood, reference will now be made to the accompanying drawings in which:

FIG. 1 shows a block diagram of a typical layout consisting of a central control station and four field stations;

FIG. 6 shows a block diagram of four stations with transmitting priorities according to one arrangement;

FIG. 7 shows a block diagram of eight field stations with transmitting priorities according to an alternative arrangement;

Figure 5:
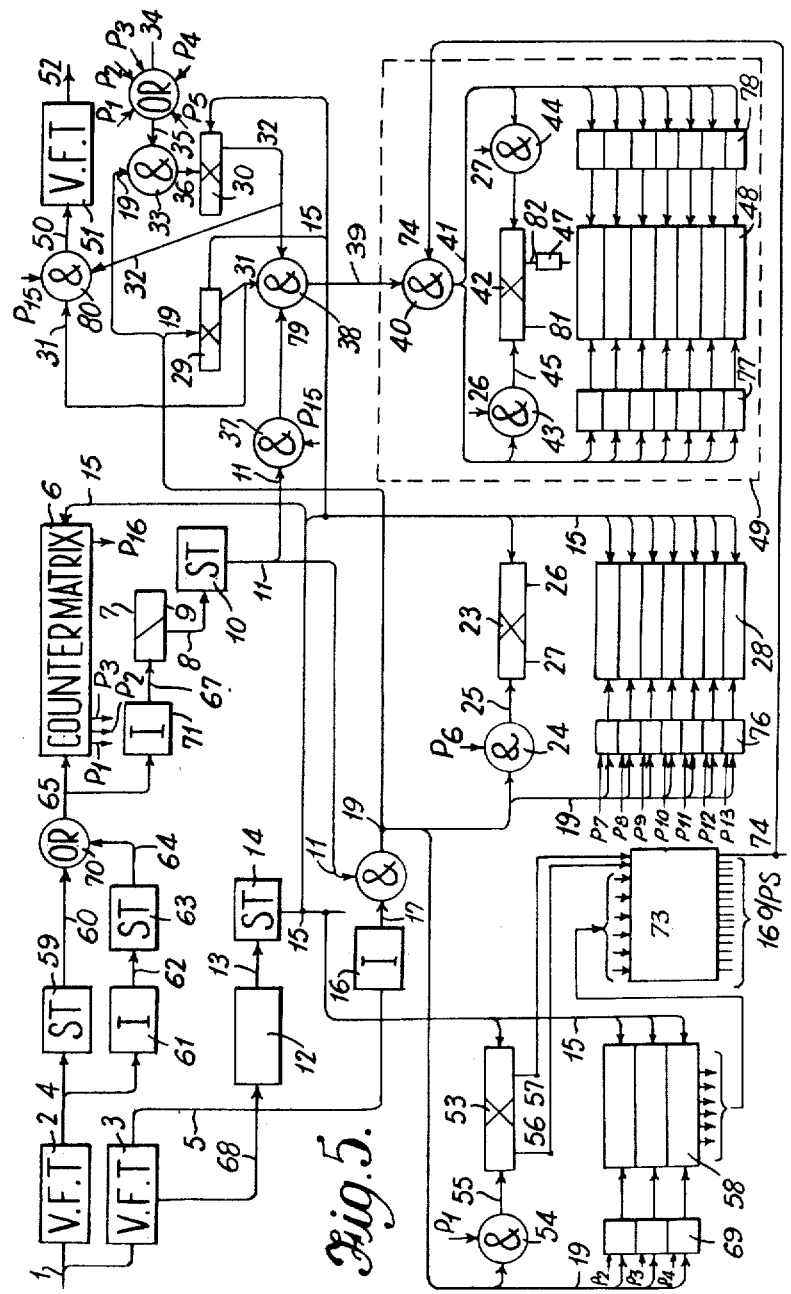
FIG. 5 shows the logical diagram of a receiver.
Figure 9:
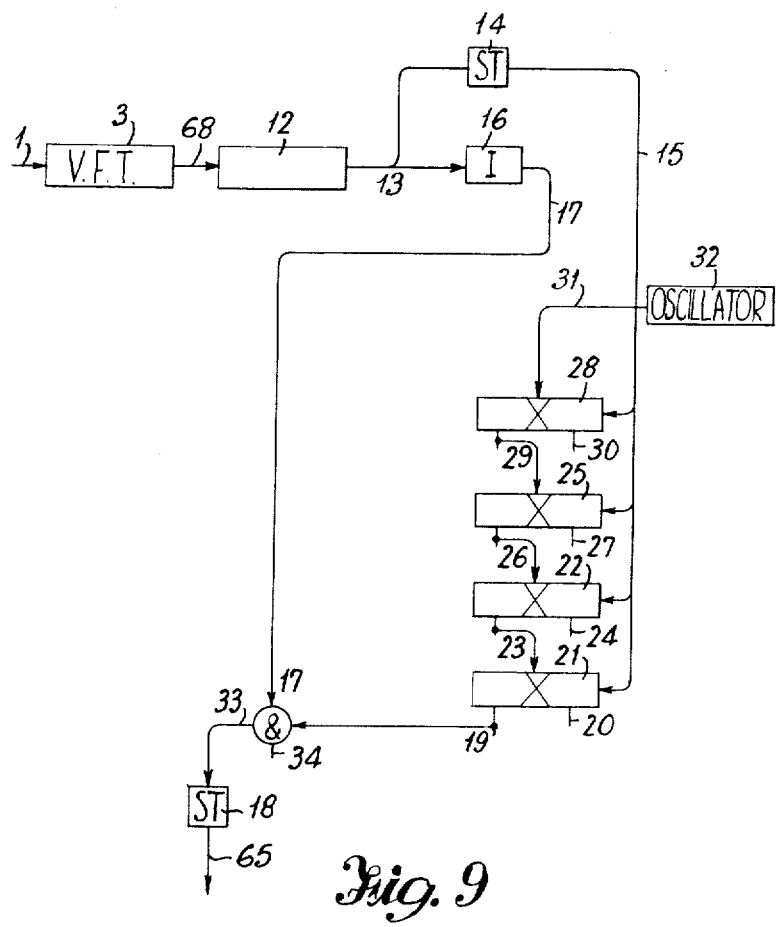
Figure 10A:
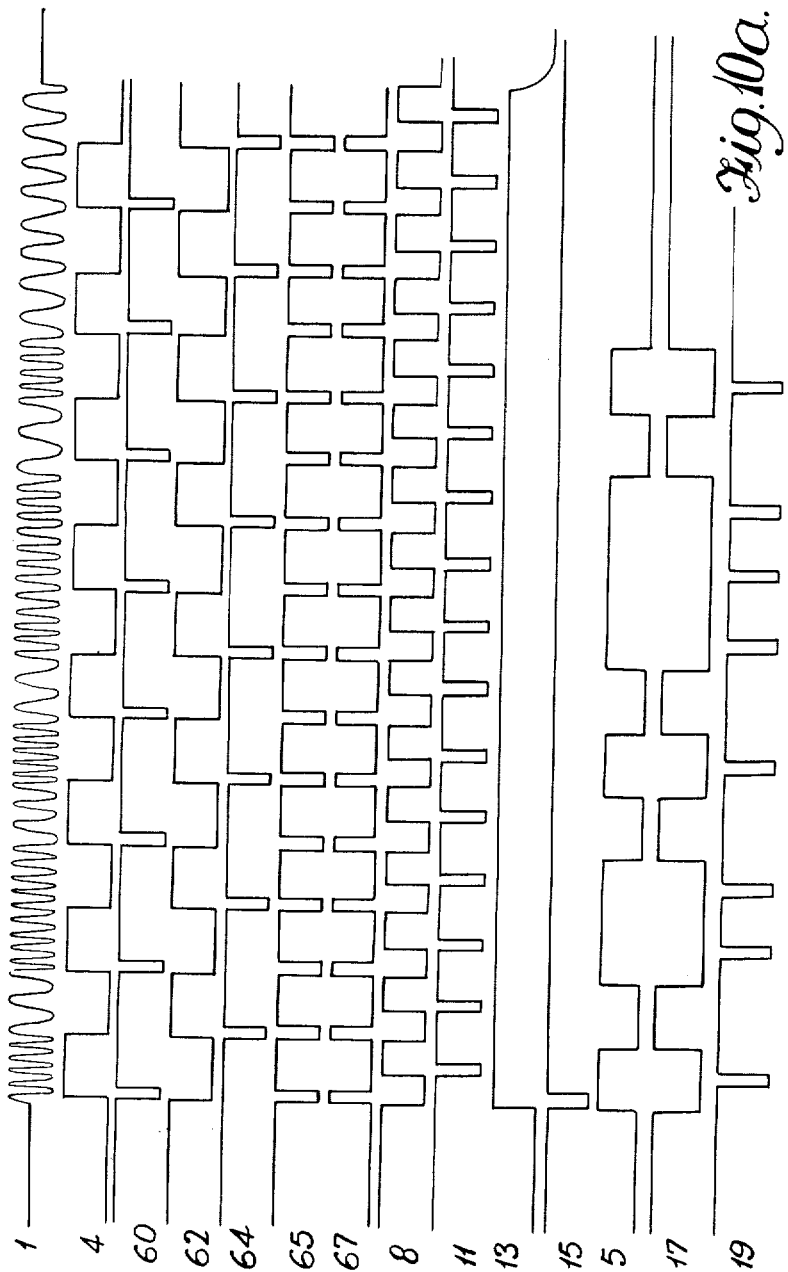

FIG. 9 shows a logical diagram of an alternative arrangement of a receiver which does not require the transmission of a timing or clock signal for synchronising; and FIG. 10 shows the waveforms generated in the receiver according to the alternative arrangements of FIGS. 5 and 9. The group of waveforms shown in FIG. 10(a) refer to FIG. 5 and the group of waveforms in FIG. 10(b) refer to FIG. 9. The diagrams are thought to be self-explanatory when read in conjunction with the description of FIGS. 5 and 9 respectively, the waveforms being labelled with the numbers corresponding to the lines on which they appear in FIGS. 5 and 9.

In the following description the terms Slot, Digit and Frame are used. A slot is the basic period of time in a serial signal train occupied by a single item of information known as a digit. A frame is a group of slots defining a period occupied by a single complete message.

In the description, voice frequency telegraph (V.F.T.) equipment is used in conjunction with telegraph cables as the means of communication between the central control position and the respective field stations, although no such limitation is implied and it will be obvious to those skilled in the art that alternative means of communication such as radio transmitters and receivers could be used without departing from the true spirit and scope of the invention.

The V.F.T. transmitter is modulated by the serial trains of signals from a digital transmitter to provide signals suitable for transmission in the cable and the V.F.T. receiver converts the signals received from the cable to a form suitable for use in the digital receiver and storage system.

Two types of V.F.T. are well known, amplitude modulated (A.M.) and frequency modulated (F.M.). In the A.M. type the transmitter is quiescent during transmission of a space signal or "0" digit and sends a burst of an audible tone during the transmission of a mark or "1" digit. In the F.M. type the transmitter sends an audible tone continuously, the frequency of which is shifted so that, for example, during the transmission of a "0" digit a tone of frequency F1 is sent and during the transmission of a "1" digit a tone of frequency F2 is sent. The output of a receiver of either type is one of two direct potentials at any time depending on whether a "0" or "1" digit is being received. Input to a transmitter of either type is one of two direct potentials depending on whether a "0" or "1" digit is being sent.

When using a F.M. type V.F.T. system a further possibility is to amplitude modulate or key the sender which is normally quiescent giving a hybrid arrangement. In a preferred arrangement of the invention a F.M. V.F.T. system is used in this manner, the transmitters, normally quiescent, being brought into action only for the duration of transmission of a frame of information.

Standard V.F.T. systems of either type normally operate in the audio frequency range in a band lying between about 500 c./s. and 3500 c./s. and the band is divided up into channels of approximately 120 c./s. in width thereby limiting the digit transmission rate to the order of 50 digits per second. Some 24 separate telegraph channels can be accommodated within the above band. The rate of 50 c./s. for the basic digit rate is because of this limitation, but it is not to be regarded as a limitation of the invention in view of the alternative types of communication that may be employed.

Either two-wire or four-wire communication may be employed with the voice frequency telegraph system. In the case of two-wire transmission, separate transmitting and receiving frequencies are used for a two-way communication, the signals being separated by suitable filters. In the case of a four-wire communication system, one pair of wires is used for carrying the signals in one direction, and the second pair is used for carrying the signals in the opposite direction and a common frequency may be used. A two-wire system is capable therefore of carrying some twelve two-way communications within the band and a four-wire system is capable of carrying some twenty-four two-way communications within the band. In a preferred arrangement of the invention four-wire communication has been employed although no such limitation is implied thereby.

Referring to FIG. 1, FIG. 1(a) shows the arrangement of communications between a central control position C and four typical field stations 1, 2, 3 and 4 when using a two-wire system, each station containing a voice frequency telegraph transmitter TX and a voice frequency telegraph receiver RX connected in parallel to the same line 5 as shown in FIG. 1(b). FIG. 1(c) shows the arrangement of communications between a central control position C and four typical field stations 1, 2, 3 and 4 when using a four-wire system, each station containing a voice frequency transmitter TX and two voice frequency receivers RX1 and RX2. The transmitter TX and the receiver RX1 are connected in parallel to a line pair 5 and RX2 is connected to the line pair 6 as shown in FIG. 1(d). The receiver RX1 detects the presence of signals from any of the transmitters connected to line 5, the output of this receiver preventing its associated transmitter from sending simultaneously with any other transmitter.

The main problem in a control system of this type is the reduction to a minimum of the access time to any one control point. Any digit, being two state in form, may be used to communicate the condition of one two-way control or indication. It is possible to make a very long serial train of digits representing the states of the various controls or indications, but where a large number of controls or indications is required, this frame may be very long. Since a complete frame period may elapse between the operation of a control switch and the control signal reaching the receiver the access time may be long. Very rapid access times to any control point may be achieved by "addressing" each control but, where the number of controls is large, the time spent in sending the address digits which merely call the control point may partly nullify the advantages gained. By way of a compromise between addressing each control digit and addressing none of the digits, the invention contemplates associating an address with each of a number of groups of control or indication digits. In the embodiment to be described groups of eight digits are thus addressed, but again no limitation is implied by the choice of these figures, the particular number chosen being for convenience of illustration.

Figure 2:
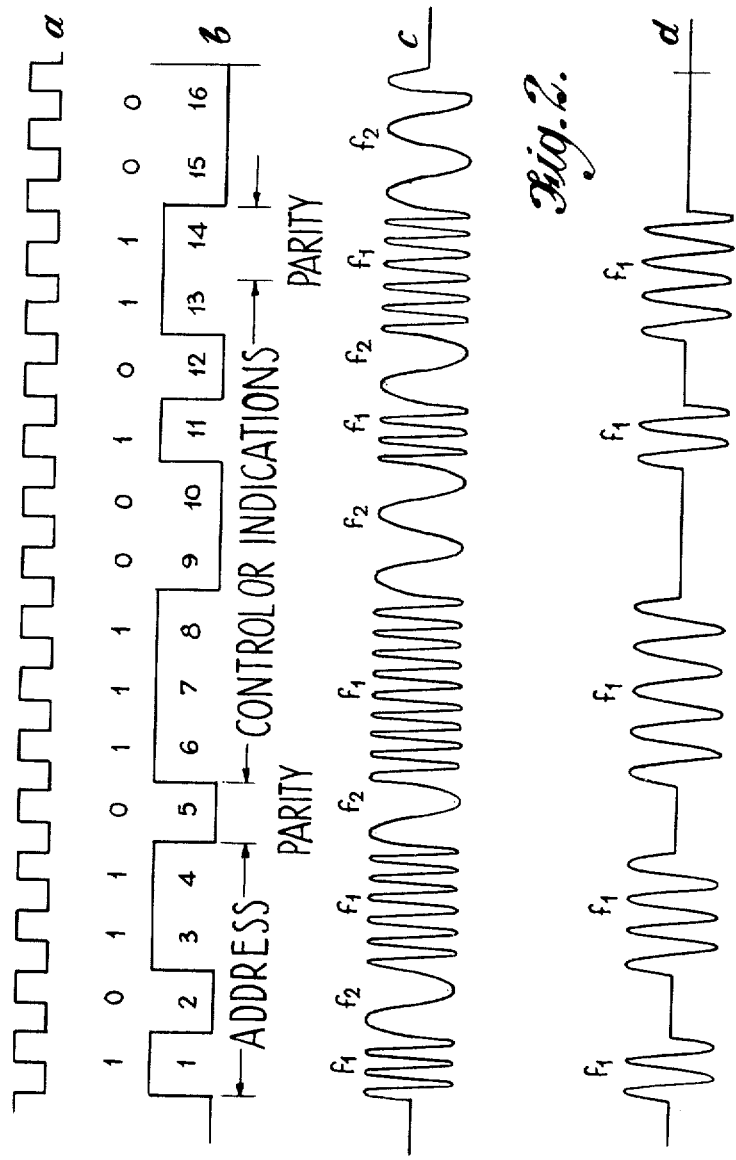
FIG. 2 shows a typical frame of signals as generated for transmission at any transmitter together with a timing waveform or clock signal.

Referring now to FIG. 2 which relates to a frame arrangement of sixteen slots, b shows a typical digital waveform used for modulating the voice frequency telegraph transmitter. Reading from left to right the first four slots contain digits used for defining the address to which the information contained in digital form in slots 6 to 13 is to be conveyed. Slot 5 contains a digit which is inserted in either 0 or 1 form so that the sum of the marks in the first five digits is either even or odd. For the purpose of clarity of description the sum has been chosen as odd. Slot 14 contains a digit either in the 0 or 1 form so that the sum of all the mark digits is either odd or even. Again for purposes of clarity the sum is chosen as odd. The digits in slots 5 and 14 are known as parity digits. As will be seen later, arrangements are provided in the receiver for checking that these two sums are odd, failing which the information is rejected as incompatible. This arrangement provides a measure of safety against transmission interference and certain faults. It will be seen that in the particular address example given the first four slots are filled with digits 1 0 1 1 respectively, the fifth slot being filled with a 0 making the sum of the mark digits three, which is odd. It will be observed that slots 6 to 13 are filled respectively with digits 1 1 1 0 0 1 0 1 and that the fourteenth digit is a 1 making the total of the mark digits in the frame nine, which is odd. Slots 15 and 16 are not filled with digits for a reason which will be seen later. Waveform *a* shows a clock waveform used for defining the time periods for the slots in the frame. Waveform *c* shows the output of a F.M. V.F.T. which has been modulated by the waveform *b* and waveform *d* shows the output of an A.M. V.F.T. which has been modulated by the waveform *b*. It will be seen that the waveform *c* may be arranged to start with the beginning of the first digit and end when digit sixteen is complete providing the hybrid communication arrangement referred to previously. In the particular example shown in which the first four slots are used for defining the address to which the message contained in slots 6 to 13 is to be sent it is apparent that sixteen separate locations may be defined by binary coding of the four address digits. There is freedom of choice as to the use of the eight message digits. These may be allocated one to each control where the controls have two states only or, for example, two digits may be allocated to a control to define up to four control states by binary coding.

Figure 3:
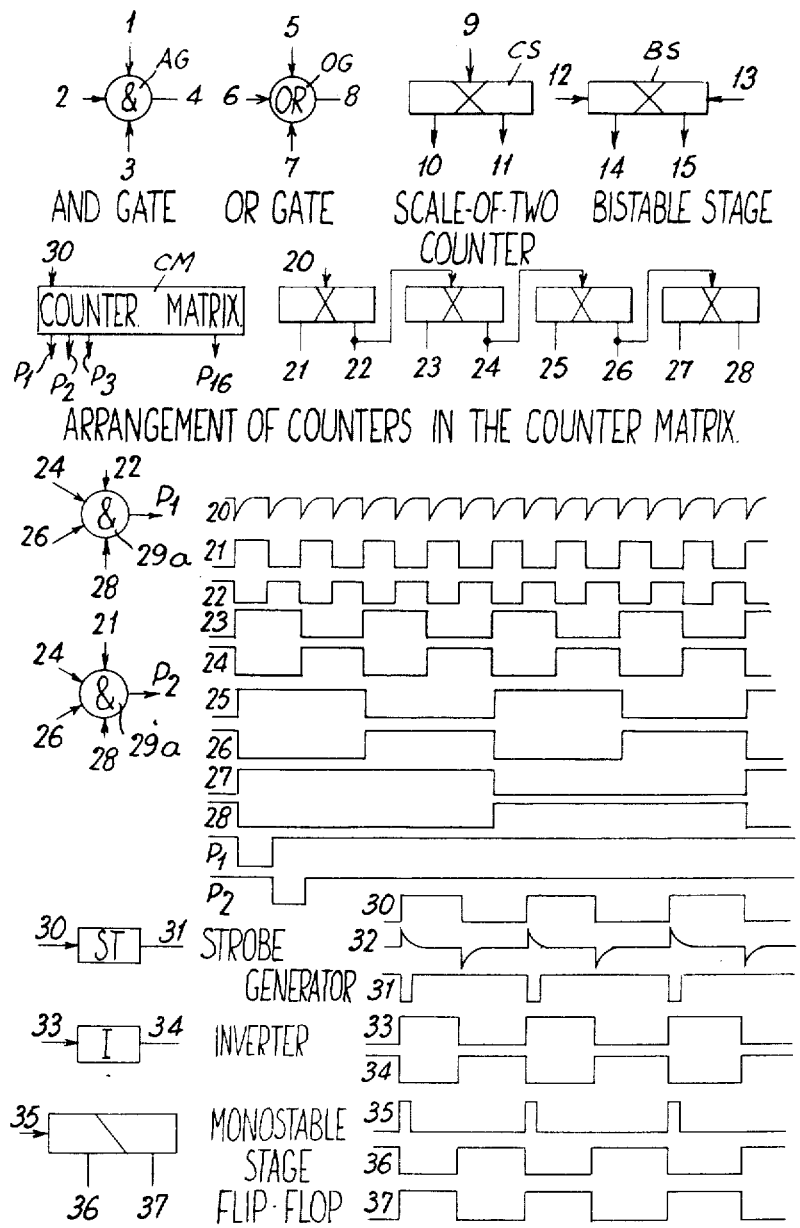
FIG. 3 shows the elements used in compiling the logical diagrams of FIGS. 4, 5, 8 and 9.

Refer now to FIG. 3 which shows the elements used in the logical diagrams. "AND" gate AG, as illustrated, consists of three inputs 1, 2 and 3 applied to three diodes, and an output 4. The arrangement of diodes is such that an output is obtained only when all three inputs are negative-going ("Down") together. Any number of inputs may be used, the number of diodes being adjusted accordingly. An "OR" gate OG, as illustrated, consists of three inputs 5, 6 and 7 applied to three diodes, and an output 8. The arrangement of diodes is such that an output is obtained when any one of the three inputs is negative-going. Again any number of inputs may be applied. A scale-of-two counter CS, which may be of the Eccles-Jordan type, contains two active elements one of which is in the conducting state while the other is in the cut-off state. A negative-going input pulse 9, when applied to both active elements, reverses the state of both elements and reverses the polarity of the two outputs 10 and 11 which, at any time, are of opposite polarity, one being "Up" and the other "Down." A similar arrangement of the same two elements can constitute a bistable stage BS, in which separate inputs 12 and 13 are applied to the two active elements. A negative-going input 12 causes the output 14 to take an "Up" state and output 15 to take a "Down" state, and a negative-going input 13 causes the output 14 to take a "Down" state and output 15 to take an "Up" state. The logical representation of a counter-matrix CM has an input 20 and a set of outputs such as P1, P2, . . . Such a counter-matrix may comprise, for example, four cascaded scale-of-two counters in conjunction with a waveform combining matrix. Thus four counters 16, 17, 18 and 19 for a negative-going input 20 may be connected as shown and their outputs 21, 22, 23, 24, 25, 26, 27 and 28 applied, to a matrix of diodes in "AND" gate form, of which "AND" gates 29a and 29b are representative, to produce a series of negative-going pulses P1, P2 . . . in time sequence. The waveforms appearing at points 20 to 28 inclusive and two pulses P1 and P2 from the combining matrix are shown. A total of sixteen outputs is obtainable from the example used in the illustration. It will be appreciated that the negative-going nature of the pulses referred to above is selected for convenience. It could equally well have been positive-going, the circuits being suitably modified as required.

A strobe generator ST is a circuit functioning to produce a negative going output pulse coincident with each leading edge of a positive-going input waveform. To this end, an input square wave on line 30 is first differentiated and the positive-going differential signal is then inverted and squared to produce the required output pulse on line 31. The input and output waveforms on lines 30 and 31 are shown against the corresponding numbers and the differentiated input waveform is shown at 32.

An inverter stage I reverses the polarity of an input square wave on line 33 to produce an inverted output on line 34. The input and output waveforms are shown against the corresponding numbers.

A monostable stage, a "flip-flop," has an input 35 and two outputs 36 and 37. When the potential of output 36 is "Down" the potential of output 37 is "Up" and vice versa. In the quiescent condition, the potential on line 36 is "Up" and the potential on line 37 is "Down." A positive-going input pulse on line 35 changes the states of the outputs on lines 36 and 37, the potential of line 36 going "Down" and the potential of line 37 going "Up." The states of the outputs revert to the quiescent states at the end of a period of time depending on the intercoupling time constant. In the waveforms shown, 35 is the input waveform and 36 and 37 are the output waveforms on the correspondingly numbered lines, the time constant being chosen, as an illustration, so to cause the circuit to revert to the quiescent condition approximately half way between two input pulses.

Practical forms of "AND" and "OR" gates, of counters, strobe generators, inverters and "flip-flop" are well known to those skilled in the electronics art and since their actual circuitry forms no part of the present invention it is thought to be unnecessary to go into details here. It may be said, however, that as regards the counters, strobe generators, inverters and "flip-flops" it is contemplated that conventional thermionic valve circuits or, preferably, equivalent transistor circuits would be used in which the valves or transistors would be driven between fully conductive and virtually non-conductive conditions, thereby producing output of effectively square waveform.

Figure 4:
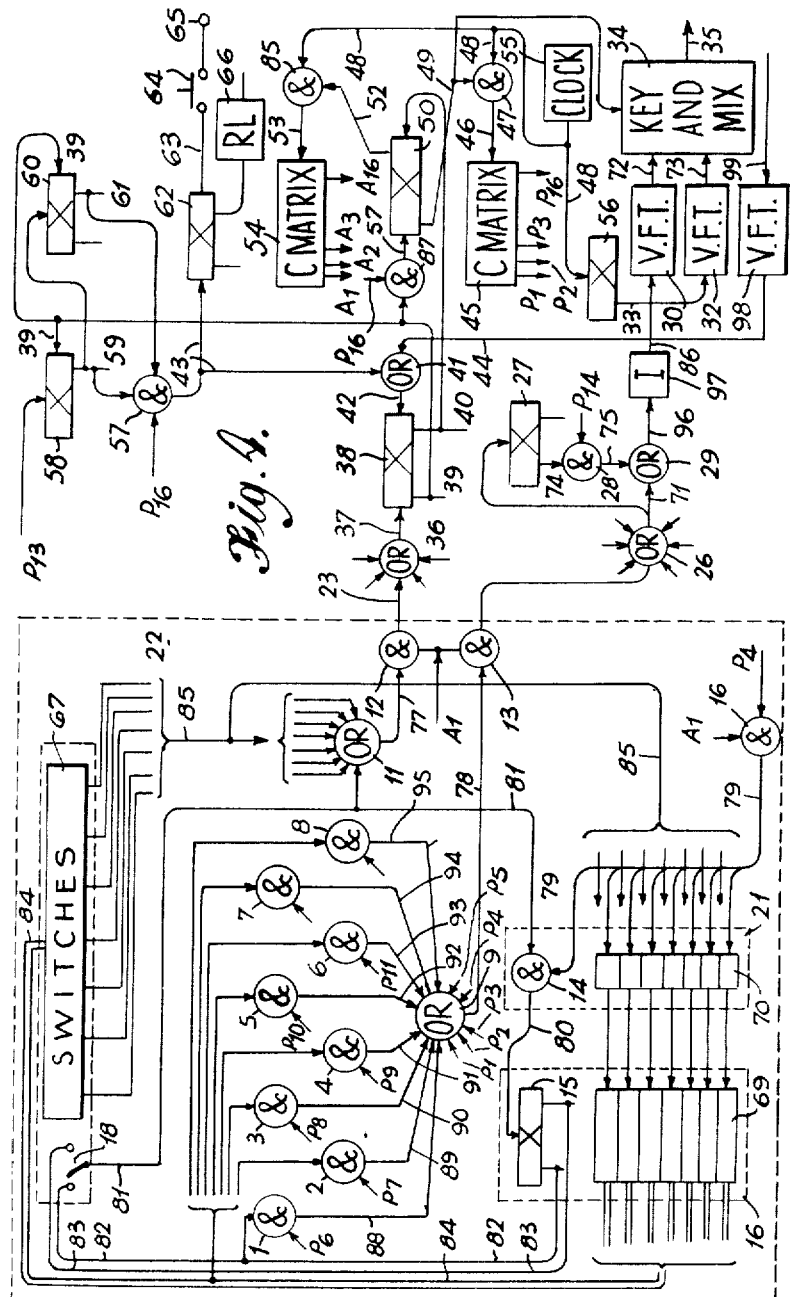
FIG. 4 shows the logical diagram of a transmitter.

Referring now to FIG. 4 of the drawings, which shows the logical diagram of a transmitter according to the invention, it is assumed that this is at a control station from which a number of receiving field stations are remotely controlled. Control switches at the station are divided into a number of address groups only one of which is shown and each of which may relate to a particular field station or to a particular group of controlled components at such field station. For clarity of description eight two-state control switches and hence eight control digits have been allocated to each address group in the station and four address digits define, by binary coding, sixteen separate address groups, the digits being transmitted in a frame of sixteen slots. It must be understood that in selecting these arbitrary numbers no limitation is implied thereby. For indication transmission, each field station could include a similar transmitter in which the control switches would be replaced by indication contacts. This field station transmitter may include only one address group of indication contacts (covering all the indications to be transmitted from that station) or may include a number of address groups: in either event, all the address groups included in the several field stations would have different binary codes allocated to them.

In the transmitter of FIG. 4, a clock frequency is generated by, for example, an oscillator 55 producing a square waveform output on lines 48. This is applied to a scale-of-two counter 56 to produce on line 33 a clock signal of half frequency for modulation of the clock V.F.T. transmitting unit 32, the output of which on line 73 is applied through a keying and mixing stage 34 to the transmission line 35. The clock signal on lines 48 is also applied to "AND" gates 85 and 47 to which are connected the outputs 49 and 52 respectively of a bistable stage 50. So long as the output 52 is "Down," a gate 85 is open to pass the clock signal over line 53 to an "A" waveform counter-matrix 54 which produces negative-going pulses A1 to A16 in time sequence. The clock signal is prevented from reaching a "P" waveform counter-matrix 45 at this time by reason of the "Up" state of line 49 and the keying stage 34 isolates the line 35 from the data V.F.T. transmitting unit 30, also by reason of this state of line 49. In the transmitter station illustrated, the clock V.F.T. transmitting unit 32 is also isolated from the line 35 at this time by the keying stage 34. In the case of the control station however, the keying and mixing functions may be effected in separate stages, the output from the clock transmitting unit 32 being applied without keying directly to the mixing stage. In this way the clock signal would be continuously applied to the line 35 and could therefore be used for checking that the system is in working order.

The "A" waveform counter-matrix now searches the 16 address groups of which only one, 22, is shown, the others being logically identical in organisation. Assuming that address group 22 is the one to which the A1 waveform relates, a (negative) A1 pulse as applied to the "AND" gate 12 connects line 77 to line 23 through this gate. For reasons which will be seen later the potential of line 77 may be either "Up" or "Down." If the potential of line 77 is "Up" the potential of line 23 will be "Up." Line 23 is one of sixteen inputs to the "OR" gate 36, the remaining inputs being the corresponding lines from the remaining address groups. The potential of each of the input lines to the "OR" gate 36 is "Up" in the absence of an "A" pulse to its corresponding "AND" gate 12 and the potential of the output line 37 is always "Up" if the potential of none of the lines 77 is "Down." If A1 applied to the "AND" gate 12 meets the condition where the potential of line 77 is "Down," (the condition which it has when the position of a control switch in address group 22 has been changed, as will be described later) then the potentials of lines 23 and 37 are "Down." Similarly, if any of the other inputs to the "OR" gate 36, as defined by the respective "A" waveforms A2 to A16, are "Down" the potential of line 37 goes down. Line 37 is applied to one side of the bistable stage 38. If the potential of line 37 is "Up," the potentials of the output lines 39 and 40 of stage 38 are "Down" and "Up" respectively. Line 40 is connected to one side of the bistable stage 50 and in this condition maintains the potentials of the output lines 49 and 52 of stage 50 in the "Up" and "Down" conditions respectively to cause the "A" waveform counter-matrix 52 to be continuously triggered through the gate 85 by the clock signal 53: that is, the "A" waveform counter-matrix continues to search the addresses.

If, when A1 is applied to the "AND" gate 12, the potential of line 77 is "Down," then, as previously described, the potentials of lines 23 and 37 will assume "Down" states and the bistable stage 38 will change its states, the potentials on the output lines 39 and 40 becoming "Up" and "Down" respectively. When the potential of line 40 goes down, the bistable stage 50 changes its state and the potentials of the output lines 49 and 52 become "Down" and "Up" respectively. Gate 85 is now closed and the counter-matrix stops at the A1 waveform, maintaining a steady "Down" potential on the A1 leads. Gate 47 opens to pass the clock signal 48 to line 46 and the "P" waveform counter-matrix is therefore caused to produce negative-going waveforms P1 to P16 in time sequence, this process being repeated until the "AND" gate 87 allows the passage of a P16 pulse to restore the states of the stage 50 to their former condition. This can only happen if the bistable stage 38 reverts to its original state in which the output potentials 39 and 40 are in the "Down" and "Up" states respectively.

The transmitter, as will be seen later, is arranged to accept from the remote station to which it is sending a signal acknowledging that the station has received the transmitted information correctly. This signal, received by the V.F.T. receiving unit 98 from line 99, is transmitted from the remote station during the P15 pulse period and arrives at the transmitter being described to appear on line 44 as a negative-going pulse. This is applied to "OR" gate 41 and drives the line 42 negative thereby restoring the state of the bistable stage 38 to its original condition, the potentials of lines 39 and 40 becoming "Down" and "Up" respectively. Pulse P16 is then passed by the "AND" gate 87 to restore stage 50 to its original condition. The action of stage 50 is such as to cause either the "A" waveform counter-matrix or the "P" waveform counter-matrix to be driven by the clock signal but not both simultaneously.

The data (controls) to be transmitted, assumed to be two-state, are represented by the settings of respective scale-of-two counters of which counter 15 is representative, the settings of these counters being determined, as will be described, in accordance with the positions to which control switches such as 18 are set. The other control switches and their associated counters are represented in block form at 57 and 69 respectively. When line 82 of counter 15 is in the "Up" state, it is in the condition for producing a "0" or space digit in the serial train and when in the "Down" state is in the condition for producing a "1" or mark digit in the serial train. The outputs on lines corresponding to 82 from the counters 15 and 69 are taken to "AND" gates 1–8 as indicated and the outputs P6 to P13 from the "P" waveform counter-matrix are also connected respectively to these "AND" gates. The outputs 88 to 95 inclusive from gates 1–8 constitute eight out of thirteen inputs to an "OR" gate 9, the output 78 of which is taken to the "AND" gate 13 to which is applied the A1 waveform from the "A" counter-matrix. The remaining five inputs to the "OR" gate 9 are taken as required, according to the code identifying the address group (22) concerned, from waveforms P1 to P5 of the "P" counter-matrix. Only those of the P1 to P5 waveforms are connected as are required to generate "1" or mark digits in the appropriate slots of the address portion of the serial train plus the address parity digit in the fifth slot to produce an odd total of marks in the first five slots. The potential of line 78 remains "Up" in the absence of a negative-going signal on any of the inputs to the gate 9 but drops to the "Down" condition when any one of the inputs is "Down." The effect of connecting a "P" pulse to gate 9 is to produce a "Down" potential pulse on line 78 at the time of generation of that "P" pulse. Considering the action of the "AND" gate 1 by way of example, if the potential of line 82 is "Up" by reason of the state of the counter 15, the potentials of the output lines 88 and 78 remain "Up" during the application of the P6 waveform to the gate 1, whereas if the potential of line 82 is down, the potentials of the output lines 88 and 78 drop to the "Down" condition for the duration of the applied negative-going P6 waveform. This action is typical of that of the other gates 2–8 also, and the overall effect is that the states of the eight counters 15 and 69 are sampled by the P6-P13 waveforms in succession and in equal periods of time as defined by the clock frequency. Since the "P" waveforms are applied in parallel to the appropriate gates in all address groups such as 22 simultaneously, gate 13 is inserted in the output line 78 and remains closed except when the appropriate "A" waveform (A1 for group 22) is generated by the "A" counter-matrix. The output line 24 of the "AND" gate 13 is taken as one of the inputs to the "OR" gate 26. Outputs of the "AND" gates similar to gate 13 but associated with other addresses are also taken as inputs to the "OR" gate 26. Each address group can therefore, at a time defined by the "A" waveform applied to the relevant gate such as 13, insert on line 71 through the "OR" gate 26 its serial train of signals comprising the address and parity digits in the P1–P5 periods and the control digits in the P6–P13 periods. Since the potential of line 71 is "Down" during the generation of a mark or 1 digit and is "Up" during the generation of a space or 0 digit and since the conventional V.F.T. transmitter 30 requires the opposite conditions for modulation, an inverting stage 97 is inserted, its output line 86 being connected as the modulating line to the V.F.T. transmitting unit 30. A typical modulation waveform is as shown in FIG. 2b.

The digit P14, which is the final parity digit, is inserted on line 96 as follows. Scale-of-two counter stage 27 counts the mark digits on line 71. The potential of the output line 74 is initially "Down" at the start of a frame as re-set by P16. If an odd number of marks has been counted in digits P1–P13, the output potential on line 74 is in the "Up" condition. If an even number of marks has been counted the output potential on line 74 is in the "Down" condition. The output line 74 is taken to the "AND" gate 28 to which also is applied the negative-going P14 waveform. The effect of the gate is to produce a negative-going pulse, corresponding to a mark, on the output line 75 during the P14 pulse if the count is even and no negative-going pulse on the output line 75 if the count is odd, thereby producing a space. This always makes the total number of marks in a frame odd. The final parity digit is mixed with the address and control digits on line 71 in the "OR" gate 29.

The manner in which a change in the setting of a control switch is detected and the state of the corresponding counter such as 15 brought into conformity therewith will now be described taking switch 18 by way of example. The moving contact of switch 18 selects one of the two outputs 82 or 83 from the scale-of-two counter 15. Assume that switch 18 is in the position shown, and that counter 15 has a corresponding setting in which the potentials of line 82 and line 83 are in the "Up" state and "Down" state respectively. The potential of line 81 is therefore "Up" and, if all similar inputs 85 applied to the "OR" gate 11 are "Up," the potential of line 77 is "Up." When the A1 waveform from the "A" counter-matrix appears on the "AND" gate 12, the potential of line 23 will remain "Up" and, as explained previously, the "A" waveform counter-matrix proceeds to the waveform A2 for the next address. However, if the switch 18 is changed so that the setting of counter 15 is out of correspondence with it, the following occurs. Line 81 is now connected to line 83 the potential of which is in the "Down" state. When the A1 waveform appears on the "AND" gate 12, the potential of the output line 23 drops to the "Down" state. As previously explained, when this condition occurs the "A" waveform counter-matrix 54 is isolated from the clock signal at gate 85 so that a steady "Down" potential is applied to the A1 leads. Under control of the "P" waveform counter-matrix the address group 22 now produces its serial train of signals in the manner previously described. During the address portion of the train, for instance in the P4 period, the P4 waveform is applied to an "AND" gate 16 to which the A1 waveform is also applied, with the result that a negative-going signal is produced on line 79. This signal is applied to an "AND" gate 14 to which line 81 is also connected, so that by virtue of the "Down" potential of line 81 a signal appears on line 80 to cause the scale-of-two counter 15 to change its states and thus come into correspondence with the position of switch 18. The potentials of lines 82 and 83 have now been reversed, the potential on line 82 now having the "Down" state and the potential on line 83 having the "Up" state. The potential of line 81 also changes to the "Up" state. Since line 79 is connected also to "AND" gates 70 which are similar to gate 14 and are likewise connected to the lines 85 from the other control switches, any other scale-of-two stages which were in a state where the potentials of lines 85 were "Down" (as a result of changes in the switches 67) will also change over to cause these potentials to change to the "Up" state. The control signals produced in the serial train during the P6–P13 pulse periods will therefore be marks or spaces dependent on the states of the counters 15 and 69 and thus on the positions of the switches 18 and 67. Consequent on the counters 15 and 69 coming into correspondence with the control switches the potentials of lines 23 and 37 return to the "Up" state, without effect on the bistable stage 38, and remain thus until the A1 waveform reappears and one or more of the control switches has been moved.

If the remote station fails to respond by having rejected the received information as incompatible, no signal is produced on line 44 and the bistable stages 38 and 50 are not re-set. The result of this is that the "P" waveform counter-matrix causes re-transmission of the entire frame of signals from address group 22. This process would continue until either the remote station responds or until some fault responsive system at the transmitter responds. Such a fault responsive feature will now be described. Successive transmitted frames of signals are counted by two scale-of-two stages 58 and 60, this being done by counting the recurrence of any one of the P pulses, for example P13, as applied to stage 58. The two stages can count to a maximum of four transmissions. In the particular arrangement shown, negative-going outputs appear on lines 59 and 61 at the end of three counts. These are applied to an "AND" gate 57 to which also is applied the P16 waveform. The result of this is that a negative-going signal is produced on the output line 43 coincident with P16 after three successive transmissions from the one address group have been counted. This signal is applied to the bistable stage 38 through the "OR" gate 41 and changes the state of the stage 38 to cause transmission by that address group to cease. Re-setting of the counter stages 58 and 60 is normally effected from line 39 of stage 38 on receipt of the signal from the remote station indicating that the message has been accepted. The count only reaches a warning state in the absence of acceptance signals after each of three successive transmissions. The output on line 43 is also applied to one side of a bistable stage 62 which, on changing its state, operates relay 66 to operate a fault warning circuit such as a buzzer not shown. The stage 62 can be re-set by a manual push-button 64.

It will be appreciated that the clock and data signals are transmitted by modulation of different voice frequencies and that an acceptance signal could be transmitted on yet another frequency, thus permitting separation of the signals by frequency discrimination.

Referring now to FIG. 5, which shows the logical arrangement of a receiver which can be used in a system according to the invention, the input from the communication channel 1 feeds a clock V.F.T. receiving unit 2 and a data V.F.T. receiving unit 3. A detector 12, consisting of a rectifier and smoothing capacitor (not shown), is used to detect the presence of any transmission by rectifying amplified voice frequency signals received on line 68 from a point in receiving unit 3 prior to the demodulating portion thereof. The output of 12 on line 13, consisting of a positive-going pulse of duration equal to a transmitted frame of signals, is applied to a strobe generating stage 14. As explained with reference to FIG. 3, this stage produces a negative-going pulse on line 15 coincident with the leading edge of the rectified signal on line 13 and this pulse is used as a re-set signal to restore the "P" waveform counter-matrix 6 to its condition for generating P1 waveform, and also to restore address decoding bistable stages 53 and 58, together with temporary data decoding bistable stages 23 and 28, to their 0 states. Only one stage, 53, is shown in logical detail. The re-set pulse on line 15 is also applied to re-set scale-of-two counters 29 and 30 so that the potentials of their output lines 31 and 32 are both "Up."

The action of the receiver is synchronised to that of the remote transmitter as follows: The output on line 4 from the clock receiving unit 2 is fed to an inverting stage 61, and also to a strobe generating stage 59, the negative-going pulse output of which is taken on line 60 as one input to an "OR" gate 70. The output on line 62 from the inverting stage 61 is fed to a strobe generating stage 63, the negative-going pulse output of which, appearing on line 64, is the second input to the "OR" gate 70. The output of the "OR" gate 70 on line 65 thus consists of negative-going pulses coincident both with the positive- and with the negative-going edges of the clock signal on line 4 and is fed to a "P" waveform counter-matrix 6 which produces waveforms P1–P16 in time sequence as previously described with reference to FIG. 3. These waveforms are generated in sympathy with the "P" waveforms at the transmitter and consequently in sympathy with the incoming digital data as it appears on line 5.

In order to reduce the possibility of a digit being accidentally fed to the wrong storage location, which could happen on account of distortions due to badly defined pulse edges and line filters, it is arranged to feed the storage system from samples taken at approximately the mid-position of each digit. To this end, the negative-going pulses on line 65 from the "OR" gate 70 are fed to an inverter stage 71 to produce positive-going pulses on line 67 which are then taken to the monostable stage 7, the action of which is as previously described with reference to FIG. 3. The stage is arranged to return to the quiescent state at approximately the mid-position between two input pulses, which is equivalent to the mid-point of a received digit. The output on line 8, which is positive-going at this instant, is fed to the strobe generating stage 10 to produce a narrow negative-going square pulse on output line 11 coincident with each positive-going input pulse. (See FIG. 10(a).)

The data output signal on line 5, comprising a positive-going pulse coincident with each received mark digit, is fed to an inverter stage 16 the output of which is a mirror image of its input and is fed on line 17 to the "AND" gate 18. The sampling pulses on line 11, applied as a second input to the "AND" gate 18, produce negative-going pulses (sampled marks) on line 19 coincident with the centre of each received mark digit.

The means for decoding the address portion of the serial train, and thereby selecting the particular storage location for the received data (being control or indication data according as the receiver is at a field station or the control station), consists of four "AND" gates 54 and 69, of which only 54 is shown in logical detail, and four bistable stages 53 and 58, of which only 53 is shown in logical detail, the eight outputs such as 56 and 57 being taken to a matrix of diodes 73 the arrangement of which is similar to that exemplified by items 29a and 29b of FIG. 3. The P1 waveform is applied as an input to the "AND" gate 54 and P2, P3 and P4 waveforms are taken to the corresponding "AND" gates 69. The sampled mark output from gate 18, appearing on line 19, is applied in common to the gates 54 and 69. As previously described, the bistable stages 53 and 58 are re-set to their 0 states at the commencement of a received frame, so that the potentials of the output lines 56 and 57 are in the "Down" and "Up" states respectively. Receipt of a negative-going sampled mark on line 19 coincident with the P1 waveform reverses the state of the bistable stage 53 by virtue of a negative-going signal from "AND" gate 54 then appearing on line 55. The potentials on lines 56 and 57 now change to the "Up" and "Down" states respectively. If no sampled mark pulse appears on line 19 during P1, the state of the stage 53 remains unchanged in the state to which it was. The stages 58 are likewise changed or left unchanged according to whether or not sampled mark pulses appear in the P2, P3 and P4 pulse periods respectively. The four stages 53 and 58 therefore decode the four address digits, one digit on each stage. The matrix 73 has sixteen outputs such as 74 only one of which will have a potential in the "Down" state after the decoding of the address digits. The or each final storage address such as 49 at the receiver includes an "AND" gate such as 40 to which is connected the particular matrix output lead such as 74 which takes the "Down" state on receipt of a transmission directed to that address.

The temporary storage system for the data digits in slots 6–13 inclusive will now be described. This consists of eight "AND" gates 24 and 76, of which only gate 24 is shown in logical detail, associated respectively with one side of eight bistable stages 23 and 28, of which only stage 23 is shown in logical detail. The negative-going sampled mark signals on line 19 are taken as inputs to the "AND" gates 24 and 76 in parallel. The P6 waveform is taken as the second input to the "AND" gate 24 and P7–P13 waveforms inclusive are taken as second inputs respectively to the seven "AND" gates 76. The negative-going re-set signal on line 15 is applied in parallel to the other sides of the eight bistable stages 23 and 28. At the commencement of a received frame of signals the bistable stages are each re-set to the 0 state in which the potentials of the output lines 26 and 27 are "Up" and "Down" respectively, the corresponding outputs of the stages 28 being in identical states. The stages 23 and 28 decode the data digits, as received in the P6–P13 periods inclusive, in a similar fashion to the action of stages 53 and 58 as previously described and it is thought to be unnecessary to repeat the description here. The reason for temporary storage of the received data in the stages 23 and 28 is one of safety in that it is only towards the end of the frame that the receiver can check if the received digits are compatible, that is, if the sum of all the marks is odd. Only after this check had been made is the decoded message fed to the final storage address such as 49. It will be observed that the temporary storage is effected whether or not the received data is intended for an address at the receiver.

The parity checking feature will now be described. An "OR" gate 34 has the negative-going P1–P5 waveforms as inputs. The output 35 is a negative-going pulse of duration equal to the sum of the P1–P5 periods inclusive (that is, to the address portion of a transmitted frame) and is applied as one input to the "AND" gate 33. The negative-going sampled marks on line 19 are applied as second input to the "AND" gate 33, so that the output on line 36 from gate 33 consists of the sampled mark pulses contained in the first five digit periods P1–P5. These are applied as input to the scale-of-two counter stage 30, re-set at the beginning of the frame by the negative-going re-set input on line 15. In the re-set condition, as previously described, the output potential on line 32 is "Up." If an odd number of marks is counted in the P1–P5 period the potential of line 32 will then be "Down" since the state of the stage 30 is reversed each time a mark is received. If an even number of marks is counted through a fault or due to transmission interference, the potential of line 32 is again "Up." A scale-of-two counter stage 29 counts the total number of mark signals received during a frame from the input line 19. Since the stage 29 operates in similar manner to stage 30, being re-set at the beginning of the frame to a condition in which the potential on the output line 31 is "Up," this potential finishes in the "Down" condition if an odd number of marks is counted in the periods P1–P14 and in the "Up" condition if an even number is counted. The outputs on lines 31 and 32 are taken as inputs to an "AND" gate 38. The negative-going sampling (strobing) output on line 11 is applied with the P15 waveform as inputs to an "AND" gate 37, the output of which, in the form of a negative-going pulse appearing on line 79 at the mid-position of the P15 period, is applied as a third input to the "AND" gate 38. If the potentials of the two inputs 31 and 32 are "Down" at the time of the P15 waveform, indicating compatibility of the received data, a negative-going pulse appears on the output line 39 during the P15 period. This is applied as an input to the "AND" gate such as 40 in the or each storage address such as 49 in the receiver, a second input being taken from the pre-selected output line 74 of the address decoding matrix 73 as previously explained. If the potential of this line 74 is "Down"

the received data is addressed to this particular store and a negative-going read-in pulse is passed by the gate 40 (assuming the data to be compatible) to appear on the output line 41. This pulse is applied to all of sixteen "AND" gates 43, 44, 77 and 78 and is used for transfer of the temporarily stored data in stages 23 and 28 to the storage devices in the address 49.

The store in address 49, as in other addresses, consists of eight bistable stages 42 and 48, of which only stage 42 is shown in logical detail. Since it is usually convenient to have final storage on a set of relays, one of the outputs 82 of the bistable stage 42 is shown connected to a representative relay 47. This relay, and corresponding relays associated with the stages 48, may be arranged to be de-energised when the associated bistable stages are in the state representing a stored 0 digit and to be energised when storing a 1 digit, although the reverse may be equally convenient. The eight "AND" gates 43 and 77 are associated respectively with one side of the bistable stages 42 and 48, and the eight "AND" gates 44 and 78 are associated respectively with the other side of the bistable stages 42 and 48. The outputs 26 and 27 of the bistable stage 23 in the temporary store are applied as inputs to the "AND" gates 43 and 44 respectively. In similar manner seven pairs of outputs (not shown) from stages 28 are taken as inputs to the "AND" gates 77 and 78 respectively. On the appearance of the read-in pulse on line 41 a pulse will be passed by one or other of the two gates 43 and 44 as dictated by the state of the bistable stage 23 and the potentials on the lines 26 and 27. This pulse, appearing on either line 45 or line 46, sets the bistable stage 42 to a state corresponding to that of stage 23. A similar action takes place in regard to the seven bistable stages 48, their states being set respectively in correspondence with the states of bistable stages 28. The states of the corresponding output relays, of which 47 is representative, will thus be set in correspondence with the received digital data.

The means by which the receiver replies to the remote transmitter that it has accepted the data includes an "AND" gate 80 to which two "Down" potentials on outputs 31 and 32 from the bistable stages 29 and 30, indicating compatibility, are applied as inputs. The negative-going P15 waveform is applied as a third input to gate 80 the output of which on line 50 is therefore a negative-going pulse of duration equal to the duration of P15. This pulse, which appears only when compatibility is found, is applied as a modulating signal to a V.F.T. transmitting unit 51 which feeds a corresponding signal to the output line 52 for transmission to the remote transmitter, there to be detected by a V.F.T. receiving unit such as 98.

FIG. 6(a) shows a block diagram of four remote stations to which transmitting priorities can be allocated according to one arrangement. Four-wire working using separate transmit and receive lines between the control station C and the field stations is assumed for convenience. The control station C transmitting on line 3, feeds the receivers at the field stations while the transmitters at the latter share line 2 as a common transmitting line to the control station. The four field stations are indicated at 10, 11, 12 and 13 respectively. It is assumed that the field station transmitters use a common V.F.T. frequency channel and it will be appreciated that the problem of time sharing the transmission line only arises if this is the case or if at least some of the transmitters use a common frequency channel. The equipment required at each field station is indicated in FIG. 6(b) where 5 represents the "clock and data" transmitters, 6 a "data accepted" transmitter, 7 the "clock and data" receivers, 8 a "data accepted" receiver and 9 a receiver detecting transmission on the common line 2 to the control station. With such a four-wire working the data transmitter may operate, for example, on a frequency channel F1, the clock transmitter on a frequency channel F2 and the data accepted transmitter on a frequency channel F3. The data and clock receivers may respond to signals transmitted from the control station on the channels F1 and F2 respectively.

By means of receiver 9, the transmission from any other field station is detected and transmission from the station including receiver 9 is inhibited until the line is clear. The possibility of two or more stations commencing to reply together on receipt of a clear line can be guarded aaginst by an arrangement of pre-set time delay circuits, each field station being allocated a specific and unique time delay T1, T2, T3 . . . as indicated in FIG. 6(a) for which the stations are assumed to have the order of priority 10, 13, 12, 11. On a clear line being detected these delay circuits are actuated and prevent their respective stations from transmitting until their end of their allocated delay periods. The station having the shortest delay has the first chance to transmit and does so only if it has changed data to send. If it has no changed data to send, the station having the next longest delay is given the chance of transmitting, and so on. If a station transmits, the other stations detect its transmission and remain silent until the end of transmission, when the delay circuits function again. The station that has just transmitted may, however, be inhibited from again transmitting until all other stations, including those with longer delays than the first station, have had a chance to transmit. The delay periods would usually be allocated so that important stations have the shortest delay and less important stations the longest delays.

It will be appreciated that by allocating separate frequency channels to different groups of remote stations, similar delays may be allocated within the several groups as indicated in FIG. 7, since each group can reply independently. This, however, involves additional frequency channels and additional digit receiving equipment at the control station. FIG. 7 shows eight stations arranged in two groups of four, the first group comprising stations 4, 5, 6 and 7 having time delays of T1, T2, T3 and T4 respectively, and the second group comprising 8, 9, 10 and 11 having similar time delays T1, T2, T3 and T4 respectively.

Figure 8:
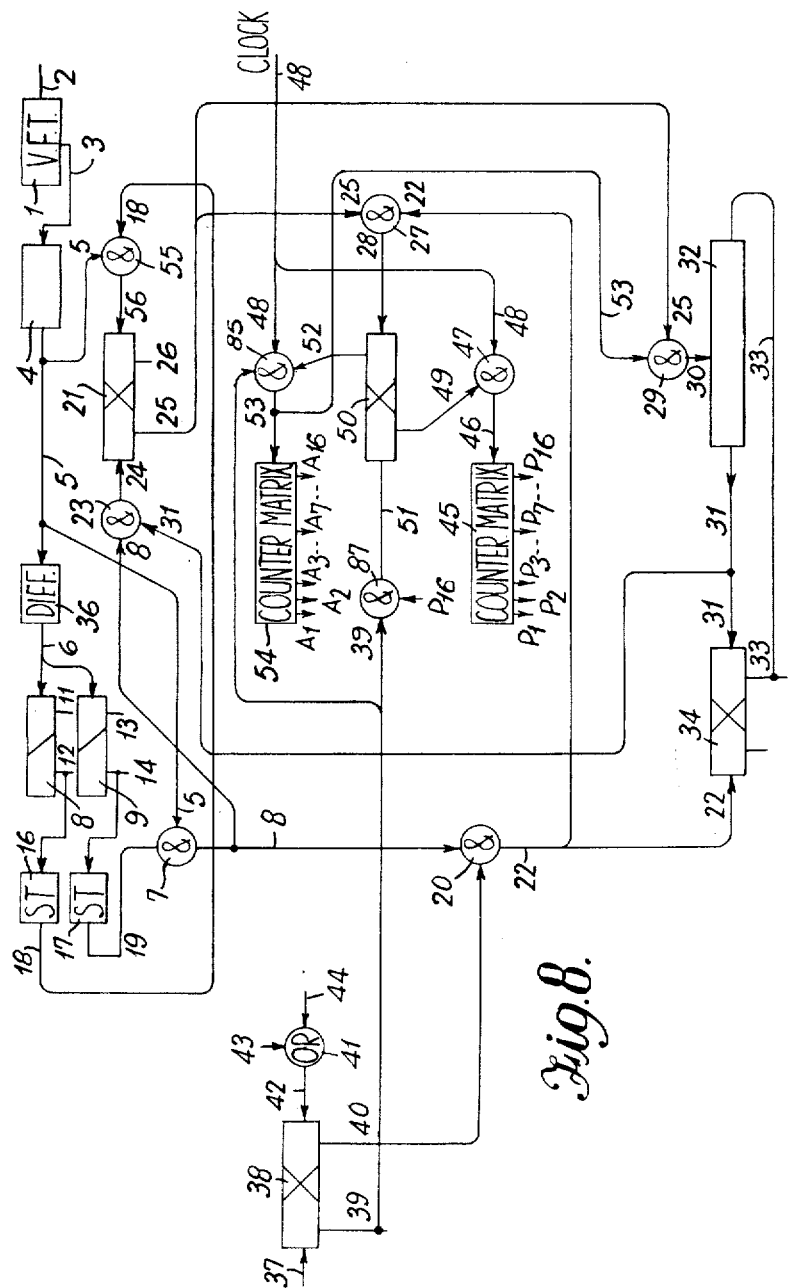
FIG. 8 shows a logical diagram for the priority allocating arrangements of FIGS. 6 and 7.

FIG. 8 shows the logical diagram of additions which may be made to the transmitter of FIG. 4 to make it suitable for use as a field station transmitter in a system in which a number of field stations are given transmitting priorities by means of delay circuits in their transmitters as just described. Items 37–54, 85 and 87 in FIG. 8 correspond to those similarly numbered in FIG. 4. A V.F.T. receiving unit 1 detects signals transmitted on the common transmitting line 2 and produces the modulated envelope of those signals at high level on line 3. This is applied to a rectifying stage 4, the output of which on line 5 (whose potential is normally "Down") is a positive-going pulse of duration equal to that of the train of signals detected. This pulse is differentiated in stage 36 to produce on line 6 a positive-going pulse coincident with the start of any detected transmission and a negative-going pulse coincident with the end of any transmission. The signal on line 6 is applied to monostable stages 8 and 9 which, operating in opposite polarity to that described in FIG. 3, respond to receipt of a negative-going signal to change their states from the quiescent state to the active state and return to the quiescent state either on receipt of a positive-going signal or after a time determined by the internal time constant, whichever comes first. The time constant of stage 9 is chosen according to the allocated priority for the station concerned: that of the stage 8 is chosen to be longer than the longest delay allocated to any station. The positive-going pulse applied on line 6 at the start of a transmission re-sets both of stages 8 and 9 to the quiescent state, the output potentials on lines 11 and 13 respectively being "Down" in this condition, and those on lines 12 and 14 "Up." The negative-going pulse appearing on line 6 at the end of a transmission triggers both stages 8 and 9 to the active state, causing the output potentials on lines 11 and 13 to go "Up" and those on lines 12 and 14 to go "Down." The potential on line 12 is taken to the strobe stage 16 to produce a negative-going pulse on line 18 when the potential of line 12 goes "Up," that is, coincident with the end of the delay period of stage 8 or at the start of a subsequent transmission whichever appears first. A negative-going pulse similarly appears on line 19 from strobe stage 17 at the end of the delay period of stage 9 or at the start of a subsequent transmission whichever comes first. The signal on line 19 is applied as one input to the "AND" gate 7, the other input being the signal on line 5. A negative-going pulse therefore appears on line 8 only at the end of the delay period of stage 9, the pulse on line 19 at the start of a transmission being inhibited by the positive-going signal which is present on line 5 during a transmission. In a similar manner the negative-going pulse appearing on line 18 at the start of a transmission is inhibited at gate 55.

The signal on line 8 is used to instruct the transmitter to send its message at the end of a prescribed delay period after any previously detected transmission. The signal on line 8 is applied as one input to an "AND" gate 20, a second input being the signal on line 40 from the bistable stage 38. When stage 38 has changed its state in response to a change in an address group as previously described with reference to FIG. 4, (following which the A waveform counter-matrix 54 will have been stopped by closure of gate 85 over line 39 but the P waveform counter-matrix 45 will not have started since gate 47 is still closed over line 49), a negative-going output is produced on line 22 coincident with the pulse on line 8. This signal is applied through an "AND" gate 27 and over line 28 to change the state of stage 50, which causes the transmitter to send its message as previously described. The "AND" gate 27 is at this time held open by a "Down" potential on the line 25, this being an output of a bistable stage 21. At the end of a successful transmission of the frame of signals, the state of stage 38 is changed by the signal indicating acceptance of the transmitted data and the counter-matrix 54 causes a search in the other address groups for changes requiring transmission as previously described. If a change has been found and no other station of shorter delay time (greater priority) is waiting to transmit, another frame of information is transmitted at a time dictated by the appearance of the pulse on line 19, the delay of stage 9 being sufficiently long to cover the scanning of all address groups lest only the last one may have data to transmit. All the address groups in the station are scanned in this way. When the last address group is reached, but prior to any transmission from it, a counter 32, represented in block form, will have counted one less than a complete cycle of the address counter-matrix 54 under control of the clock signal as it appears on line 53 and is passed by the "AND" gate 29, held open by the "Down" potential on line 25. Having reached this count the potential appearing on an output line 31 of the counter 32 changes to the "Down" state, opening an "AND" gate 23 and changing the state of a bistable stage 34 the potential on an output line 33 of which rises to the "Up" state. This change on line 33 has no effect on the counter stage 32. The next negative-going signal on line 8 instructing the transmitter to send causes a last frame to be transmitted if a change has been detected in the last address group. The signal on line 8 now also passes through the "AND" gate 23 to change the state of the bistable stage 21, the potential of the output line 25 of which changes to the "Up" state. This closes the gates 27 and 29 so that no further transmission can take place, even should a pulse appear on line 19, until after all other stations have had a chance to transmit, this being determined by the delay of stage 12. At the end of this latter delay the negative-going pulse then appearing on line 18 is passed by the "AND" gate 55 to produce on line 56 a negative pulse which resets the stage 21. This restores the potential of line 25 to the "Down" state and opens gates 27 and 29 to allow further transmission. The bistable stage 34 is not re-set to its initial state until a negative signal next appears on line 22 to indicate that the station has something to transmit and that the transmission line is free for it to do so. Resetting of the stage 34, which can happen at any time during the cycle of stations since the A waveform counter-matrix continues to be driven, re-sets the counter 32. If the station has nothing to send, the station with the next longest time delay is given the opportunity. Once the station has transmitted, it must wait until all others have been given the chance, whether they have accepted it or not. Since transmission from a station can only be initiated (by a signal appearing on line 8) following a preceding transmission, it is necessary to ensure that at least one transmission takes place in each cycle of the stations. To this end it may be arranged that the station having the longest delay always transmits when its turn comes, whether it has had any change or not.

FIG. 9 shows a logical diagram of an alternative arrangement of part of the receiver of FIG. 5. With this arrangement it is not necessary to transmit a timing or clock signal for synchronising, the keyed data signal being used for this purpose and the clock signal being generated locally in the receiver, and items 2, 59, 61, 63 and 70 of FIG. 5 can be dispensed with.

Referring to FIG. 9, items 3, 12 and 14 therein are as shown under the corresponding numbers on FIG. 5. The output on line 15, as explained previously, is a negative-going pulse coincident with the beginning of a frame of received data and is used in various parts of the receiver as a re-set signal. In FIG. 9 the positive-going waveform on line 13 of duration equal to the duration of the received frame of signals, is applied to the inverter stage 16 the output of which is a negative-going signal of corresponding duration on line 17. This signal, which in conjunction with that appearing on line 15 serves to synchronise the receiver with the transmitter, is applied as one input to an "AND" gate 34. An oscillator stage 32 produces a square wave output on line 31, the frequency of oscillation being sixteen times the required clock frequency. Items 28, 25, 22 and 21 are four scale-of-two counters, the line 31 from the oscillator being the input to the first counter 28. These counters which are re-set by the signal on line 15 at the beginning of a frame and operate in a similar manner to the counters in the counter-matrix described with reference to FIG. 3, "count down" the oscillator frequency to the required clock frequency. The output on line 19 from the counter stage 21 constitutes an internally generated clock signal and is applied to the "AND" gate 34 as the second input. The effect of the "AND" gate 34 is to produce on line 33 a train of clock signals for the duration of the incoming frame of data. The strobe stage 18 produces on line 65 a series of negative-going pulses equivalent to the signal on line 65 of FIG. 5. The effect of re-setting the counter stages 28, 25, 22 and 21 at the beginning of a frame is that the start of the clock signal coincides with the nearest cycle of the signal from the oscillator 32. The modification represented by FIG. 9 eliminates the need for the clock V.F.T. frequency channel. FIGS. 10a and 10b show the waveforms in a receiver as described with reference to FIGS. 5 or 9.

What we claim is:

1. An electronic system for the transmission of digital data between a transmitter station and a number of addresses in at least one receiver station, in which system transmitter station equipment is divided into one or more address groups and includes means associated with each address group for establishing a detectable condition in response to a change of data in said group, electronic means for scanning the address groups for one having changed data therein, and means responsive to the presence of said detectable condition at an address group for stopping the scanning action at that group and initiating the generation and transmission of a train of digit signals including a data portion consisting of signals representing data including the changed data and an address portion consisting of signals together identifying a receiving station address for which the data represented by the data portion is intended, the receiver station includes means for synchronising its action with that of the transmitter station, means for decoding the digit signals of a received train, and means which, when the address portion of a received signal train identifies an address at the receiver station, becomes effective to store in a series of discrete storage locations at that address the data represented by the signals of the data portion of the received train.

2. A transmission system as claimed in claim 1 wherein the transmitter station includes means for inserting parity signals into a signal train prior to its transmission and further includes means for re-starting the scanning of the address groups by the scanning means in response to the receipt from the receiver station of a signal indicating a successful parity check.

3. A transmission system as claimed in claim 1 wherein the transmitter station comprises in respect of each address group therein, a plurality of switching contacts adapted to be set in accordance with data to be transmitted, a plurality of bistable stages each capable of being changed from its existing state to its other state on each successive input thereto, the states of said stages being in correspondence with the settings of the switching contacts in the absence of a change of data as represented by a change of contact setting, means for comparing the states of said stages with the settings of the switching contacts and for providing on non-correspondence thereof a signal indicating that a change of contact setting has taken place, this last-mentioned signal constituting the detectable condition to the presence of which the means for stopping the scanning action and initiating transmission responds, means for bringing the bistable stages into correspondence with the contacts at a time subsequent to transmission initiation, and a plurality of marking leads connected to be marked according to the data to be transmitted and controlling according to their markings the character of the signals in the data portion of a transmitted train.

4. A transmission system as claimed in claim 1, wherein the transmitter station comprises in respect of each address group therein, a plurality of two-position switching contacts adapted to be set in accordance with data to be transmitted, a plurality of bistable stages each capable of being changed from its existing state to its other state on each successive input thereto, the states of said stages being in correspondence with the settings of the respective switching contacts in the absence of a change of data as represented by a change of contact setting, a signal lead associated with each bistable stage, a pair of output leads connected to each bistable stage and selectively connectible by the relevant switching contact to the associated signal lead on which a distinctive potential signal therefore appears when the state of the bistable stage is out of correspondence with the setting of the contact, this last-mentioned signal constituting the detectable condition to the presence of which the means for stopping the scanning action and initiating transmission responds, further means jointly responsive to such signal and to a timing signal for bringing the relevant bistable stage into correspondence with the associated switching contact at a time subsequent to the initiation of a transmission but prior to the transmission of the data portion of a transmitted signal train, and a plurality of marking leads connected to corresponding output leads from the several bistable stages whereby to be marked according to the states of the stages, said marking leads controlling according to their markings the character of the signals in the data portion of a transmitted train.

5. A transmission system as claimed in claim 4 including respective "AND" gates to which said marking leads are taken as input leads, each said "AND" gate also having another input lead thereto to which is applied a timing waveform coinciding in time with a particular digit period, different for each gate, for the data portion of a transmitted train of signals.

6. A transmission system as claimed in claim 5 including an "OR" gate to which the outputs of said "AND" gates are taken as inputs, said "OR" gate having further inputs constituted by certain other timing waveforms coincident in time with those digit periods on which, in the address portion of a transmitted signal train, and in accordance with the address to be identified thereby, signals of a given character are to be transmitted.

7. A transmission system as claimed in claim 3 including in each transmitter station address group an "AND" gate to which said signal constituting said detectable condition is applied as an input thereto, which "AND" gate also receives as another input thereto a timing waveform taken from a cycle of such waveforms which are respectively applied to the gates corresponding to the last-mentioned "AND" gate in the several address groups whereby the address groups are effectively scanned for one having a change of data as indicated by such signal, an output obtained from this "AND" gate at any address group being effective to stop the scanning action at that group and to initiate a transmission therefrom.

8. A transmission system as claimed in claim 1 wherein for decoding a received train of signals the receiver station includes a corresponding number of bistable stages together with means for setting said stages in accordance with the character of the respective signals received in successive digit periods, this last-mentioned means being governed by timing waveforms coincident with the digit periods.

9. A transmission system as claimed in claim 1 wherein the receiver station includes a first group of bistable storage stages including one such stage for each digit period of the address portion of a received signal train, a second group of bistable storage stages included in each address at the receiver station and including one stage for each digit period of the data portion of a received signal train, means for setting said storage stages in the first and second groups in accordance with the characters of the signals received in the relevant digit periods, these last-mentioned means being governed by timing waveforms coincident with the digit periods, and means governed by the combined settings of the first group of storage stages for permitting setting of the second group of storage stages only if the address including said second group is the one identified by the address portion of the received signal train.

10. A transmission system as claimed in claim 9 adapted to function with parity signals included in a transmitted train of signals, wherein the receiver station also includes an auxiliary group of bistable storage stages having one such stage for each digit period of the data portion of a transmitted signal, the means for setting the storage stages of said second group being effective initially to set the stages of the auxiliary group in accordance with the characters of the signals in the data portion of a received signal train, and being subsequently effective, provided that the received signals have been detected as being compatible and that the address including said second group is the one identified by the address portion of the received train, to transfer to said second group the data stored on the auxiliary group.

11. A transmission system as claimed in claim 1 including a plurality of transmitter field stations and a common channel over which they transmit, wherein each said transmitter station includes means for detecting the presence of a transmission in said channel and preventing the station from transmitting until after a predetermined time delay from the end of a detected transmission, this time delay being different for the several transmitting stations.

12. A transmission system as claimed in claim 1 in which the transmitted train of signals is used in synchronising the action of a receiver station to that of the transmitter station, the receiver station including means responsive to the beginning of such train of signals to generate an internal clock signal.

13. A transmission system as claimed in claim 1 wherein transmission is effected by means of alternating energy frequency-modulated in each digit period of a transmitted signal train according to the character of the signal occupying such period.

References Cited in the file of this patent

UNITED STATES PATENTS

| | | |
|---|---|---|
| 2,680,240 | Greenfield | June 1, 1954 |
| 2,706,215 | Van Duuren | Apr. 12, 1955 |
| 2,910,238 | Miles et al. | Oct. 27, 1959 |